United States Patent [19]

Zangenfeind et al.

[11] 4,073,588

[45] Feb. 14, 1978

[54] APPARATUS FOR APPLYING INDICIA TO FILMS AND ENVELOPES IN PHOTOGRAPHIC PROCESSING LABORATORIES

[75] Inventors: Helmut Zangenfeind, Puchheim; Jürgen Burchardi; Josef Lederer, both of Neubiberg, all of Germany

[73] Assignee: AAGFA-Gevaert, A.G., Leverkusen, Germany

[21] Appl. No.: 748,721

[22] Filed: Dec. 9, 1976

[30] Foreign Application Priority Data

Dec. 13, 1975 Germany ............................ 2556281

[51] Int. Cl.[2] ............................................ G03B 27/52

[52] U.S. Cl. ................................ 355/41; 346/107 C; 355/50

[58] Field of Search ...................... 226/91; 355/40, 41, 355/42, 50, 51, 39, 133, 27, 28; 346/107 C, 141

[56] References Cited

U.S. PATENT DOCUMENTS

| | | | |
|---|---|---|---|
| 2,983,187 | 5/1961 | Bone | 355/28 |
| 3,076,965 | 2/1963 | Simjian | 346/107 C |
| 3,689,155 | 9/1972 | Nishiyama et al. | 346/107 C |

*Primary Examiner*—Richard A. Wintercorn
*Attorney, Agent, or Firm*—Peter K. Kontler

[57] ABSTRACT

Apparatus for the application of different first indicia to successive envelopes for exposed photographic films and for the application of related different second indicia to associated films has a first marking unit which imprints first indicia onto successive envelopes and a second marking unit which exposes second indicia onto unexposed portions of films. The second unit is adjusted in automatic response to monitoring of adjustment of the first unit, and the two units can be actuated to apply related first and second indicia to an envelope and to the associated film only when the envelope and the film assume predetermined positions with respect to the corresponding units. The positions of successive envelopes and successive films are scanned by discrete first and second photoelectric cells. The first unit is adjusted by the first cell or in automatic response to completion of application of first indicia to an envelope. The second indicia are displayed on the control panel of the apparatus for observation by the attendants, and the control panel has switches for adjustment or resetting of a digital counter which forms part of the first marking unit.

28 Claims, 6 Drawing Figures

1
2
2a
3
4
4
5
6
6a
6A
7
8
9
10
10a
10b
11
11a
12
13
14
15
15a
15b

APPARATUS FOR APPLYING INDICIA TO FILMS AND ENVELOPES IN PHOTOGRAPHIC PROCESSING LABORATORIES

BACKGROUND OF THE INVENTION

The present invention relates to apparatus for manipulating photographic films and receptacles (especially envelopes) for such films. More particularly, the invention relates to improvements in apparatus for applying related indicia to photographic films and associated receptacles.

Economical treatment of photographic films in a processing laboratory can be achieved only if customer films are connected to each other to form a relatively long web which is thereupon transported through a developing machine, a copying machine and a severing unit which latter subdivides the web into discrete films or sections of films ready to be introduced into envelopes which are thereupon mailed or delivered to, or picked up by, dealers and/or customers. Moreover, an important prerequisite for economical processing of films is to insure that the trailing end of each preceding film is automatically spliced to the leader of the next-following film. It is already known to use an automatic apparatus which has a dark chamber for reception of cassettes or analogous containers for exposed but undeveloped customer films. The cassettes are shipped, mailed or delivered to the laboratory in envelopes which normally carry indicia identifying the dealer or the customer, depending upon whether the envelopes (with exposed but undeveloped customer films therein) are obtained from dealers or directly from customers. An attendant removes the cassettes from the respective envelopes and feeds them into the dark chamber wherein the cassettes are relieved of films (this may but need not always involve partial or complete destruction of cassettes), the films are spliced to each other end-to-end to form an elongated web, and the web is collected on the core of a reel which is ready for transport into the developing machine. As a rule, the web consists of at least 100 discrete customer films. The conversion of a large number of discrete films into a convoluted web takes up a relatively short interval of time.

As mentioned above, only the envelopes in which the cassettes for customer films are delivered or shipped to a processing laboratory carry indications identifying the customer or dealer, e.g., each such envelope can be provided with the address of a customer or dealer. As a rule, each envelope contains a single cassette. Neither the cassette nor the exposed film therein contains any identification, i.e., the employees in the processing laboratory must provide each film with indicia which render it possible to properly associate the developed films (or sections of developed films) and the prints (if any) with the corresponding envelopes. Any errors in identification of films would render proper assembly of envelopes and films impossible, especially in a large and fully automated processing plant. Complaints by customers or dealers would be to no avail since the films and the prints, together with the envelopes, normally leave the processing plant practically immediately upon completion of the order.

It was already proposed to utilize two-piece labels one section of which is attached to a film at the splicing station where the film is united with the preceding or next-following film and the other section of which is attached to the corresponding envelope. The two sections of each label carry identical or related indications which can be decoded by an automatic reader. Such two-piece labels are used in addition to customary uniting bands which serve to connect the films end-to-end. The just described prior proposal exhibits several drawbacks, especially as regards the complexity of film transport and of the means for attaching one section of each label to the respective film. Moreover, the other section of each label must be transported along an elongated path before it reaches the locus of application to the corresponding envelope; this will be readily appreciated since the envelopes are normally transported outside of whereas the (non-developed) films are transported in the interior of a dark chamber. An additional drawback of the just discussed prior proposal is that those sections of adhesive-coated labels which are attached to films ahead of the developing machine are likely to become separated from the films during transport through various stations of such machine. Still further, the ribbon of labels which are to be applied in part to films and in part to associated envelopes must be transported with an extremely high degree of accuracy because even minor deviations (e.g., in the range of one or more millimeters) are likely to result in excessive shifting of the separation line between the sections of a label. This leads to improper identification of films and prevents the introduction of such films into appropriate envelopes.

SUMMARY OF THE INVENTION

An object of the invention is to provide a novel and improved apparatus which invariably insures proper identification of successive films and of the associated envelopes or analogous receptacles.

Another object of the invention is to provide an apparatus which can insure rapid, automatic and proper identification of films and associated envelopes in spite of the fact that the loci of application of indicia to films and envelopes are or can be remote from each other because the films are normally provided with indicia in a dark chamber in contrast to envelopes which can be provided with indicia in daylight.

A further object of the invention is to provide novel and improved means for synchronizing the operation of envelope marking means with the operation of film marking means in an apparatus of the above outlined character.

An additional object of the invention is to provide novel and improved means for preventing the application of indicia to the films and/or envelopes in the event of improper association of a film with an envelope and/or in the event of improper positioning of films and/or envelopes with respect to the corresponding marking means.

A further object of the invention is to provide a relatively simple apparatus whose operation is practically foolproof and which can apply to films indicia which cannot be removed, blurred or otherwise adversely affected by or as a result of the treatment to which the films are subjected prior to introduction into the associated envelopes.

The invention is embodied in an apparatus for the application of indicia (e.g., numerals) to receptacles for films and to associated films. The receptacles are preferably envelopes in which cassettes for exposed but undeveloped customer films are delivered or sent to a photographic processing laboratory and into which the developed films (or sections of such films) and prints (if any)

are to be inserted for delivery or shipment to dealers or customers. The apparatus comprises means for transporting successive receptacles and successive associated films along discrete first and second paths (the first path is preferably located outside of and the second path is preferably located in the interior of a dark chamber), first and second adjustable marking units which are respectively adjacent the first and second path and respectively include a first device (e.g., an imprinting device) for applying different first indicia to successive receptacles and a second device (preferably an optical exposing device) for applying different second indicia to successive films whereby each of the first indicia is normally related to one of the second indicia, first and second photoelectric cells, mechanical scanners, microswitches or analogous detector means for respectively scanning the first and second paths and for respectively transmitting first and second signals on detection of receptacles and films in predetermined positions relative to the corresponding marking units, means for synchronizing the first and second devices so as to insure the application of related first and second indicia in response to each actuation of the marking units, including means for blocking the actuation of at least one of the marking units (e.g., the second marking unit) in the absence of a signal from at least one of the two detector means, and means for adjusting one of the marking units (e.g., the first unit) upon each actuation of the one unit so as to set the respective indicia applying device for the application of different indicia. The synchronizing means preferably includes means for automatically adjusting the other marking unit in response to each adjustment of the one unit by the aforementioned adjusting means. The marking units can be actuated in response to the aforementioned signals.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
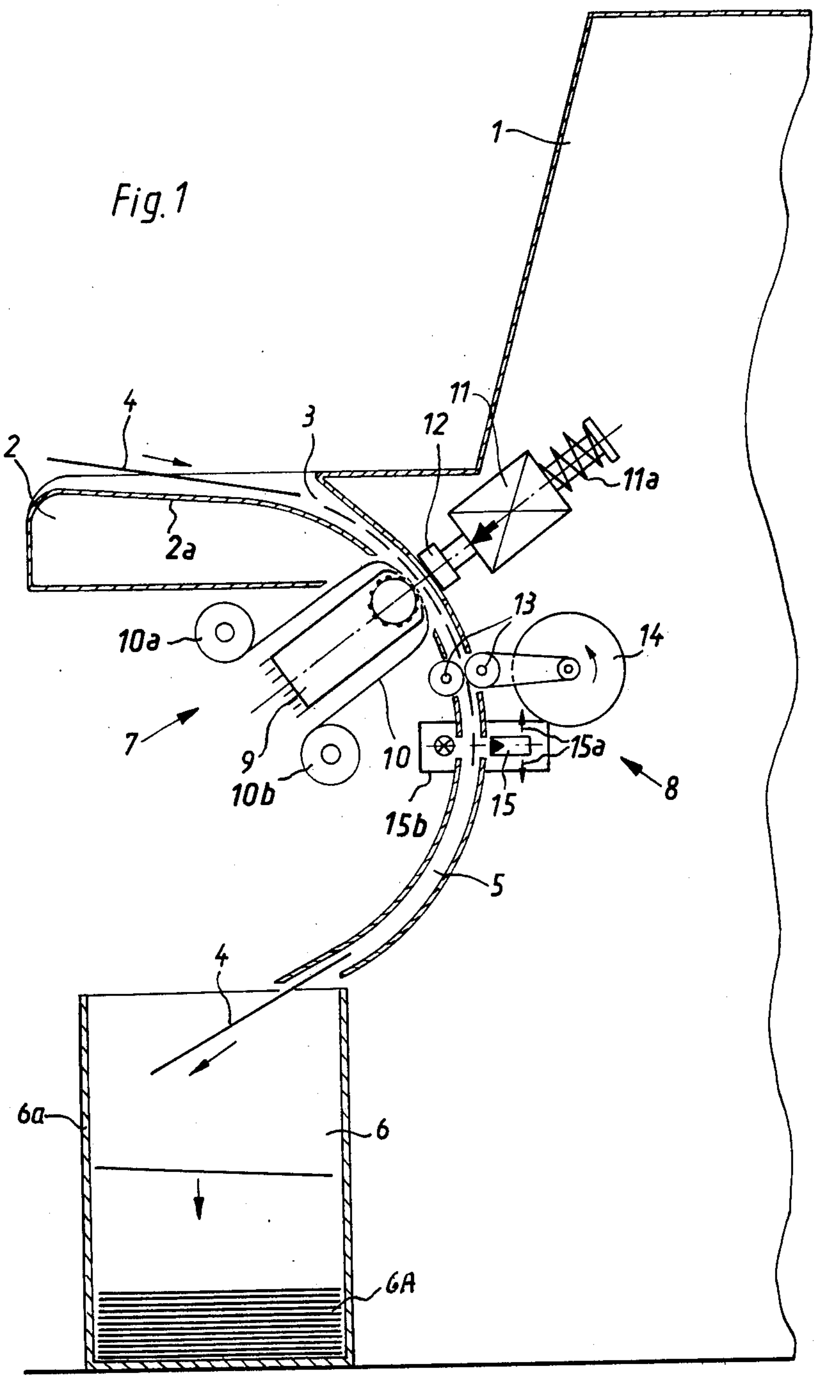
FIG. 1 is a vertical sectional view of that portion of the improved apparatus which includes the envelope marking and transporting units.
Figure 2:
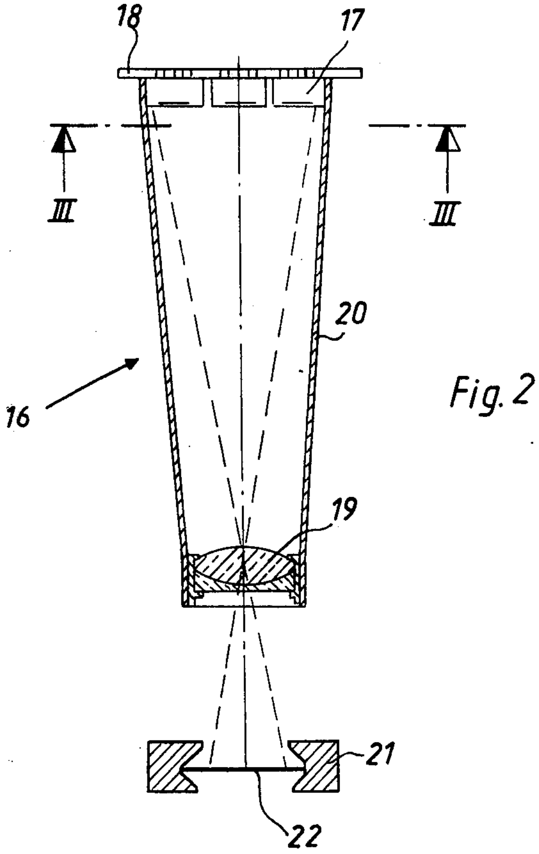
FIG. 2 is a sectional view of the film marking unit.

Referring first to FIG. 1, there is shown a portion of an apparatus which serves to apply related indicia to envelopes 4 or analogous receptacles and to associated films 22 (see FIG. 2). The apparatus comprises a housing 1 having a forwardly projecting manned control panel or table 2 with an inlet 3 for insertion of successive envelopes 4. The inlet 3 is located at the rear end of a downwardly inclined portion 2*a* of the top of the table 2 so that an attendant who stands or sits in front of the table can introduce an envelope into the slot 3 by laying the envelope flat onto the table and pushing it rearwardly and downwardly along the portion 2*a*. The envelope 4 then advances in a guide channel 5 which extends along an arc of approximately 90° and whose outlet is suitably inclined to discharge successive envelopes into an intercepting container 6. Such envelopes strike against a side wall 6*a* and are caused to descend on top of the preceding envelopes so that the envelopes of the stack 6A in the receptacle 6 are stored in the same sequence in which they are introduced into the path defined by the guide channel 5.

During travel in the guide channel 5, each envelope passes between the component parts of a first marking unit 7 and thereupon through the nip of two friction wheels 13 forming part of a transporting unit 8. The marking unit 7 comprises an indicia applying device including a digital counter 9 with four stages each of which has a decade wheel, an ink carrier or ribbon 10 whose ends are connected to a supply reel 10*a* and a takeup reel 10*b*, an electromagnet 11 and a ram 12 which constitutes or is connected with the armature of the electromagnet 11. The ribbon 10 is located between the counter 9 and that side of an envelope 4 which is to be provided with indicia, and the ram 12 is located at the other side of the envelope opposite the counter 9.

The transporting unit 8 comprises the aforementioned friction wheels 13 one of which is driven by a motor 14. The means for arresting the motor 14 in predetermined positions of successive envelopes 4 comprises a detector 15 here shown as a photoelectric cell located downstream of the nip of the friction wheels 13. The detector 15 is preferably adjustable in the longitudinal direction of the guide channel 5 (see the arrows 15*a*) so that the structure of FIG. 1 can apply indicia to selected portions of envelopes of different size and/or shape.

The means for adjusting the position of the detector 15 may include a plate-like holder 15*b* which supports the light source and the signal-generating photosensitive transducer of the detector and is movable in the directions indicated by arrows 15*a*.

The operation of the structure of FIG. 1 is as follows:

The attendant in front of the table 2 removes a cassette with exposed photographic film 22 from an envelope 4 and introduces the envelope into the inlet 3 for advancement toward and into the nip of the friction wheels 13. As a rule, each envelope 4 is long enough to insure that it can be pushed by hand all the way to a position in which its leading edge is engaged by the friction wheels 13. These wheels transport the envelope toward the container 6 but the envelope comes to a halt as soon as its leader interrupts the light beam between the light source and the photosensitive signal-generating transducer of the detector 15. The connection (not shown) between the detector 15 and the circuit of the motor 14 is conventional. When the motor 14 is arrested, the envelope 4 is in accurate register with the indicia applying device of the marking unit 7, i.e., the latter is ready for actuation to apply one or more indicia to a selected area at the left-hand side of the envelope 4 whose leader extends between the elements of the detector 15.

Figure 5:
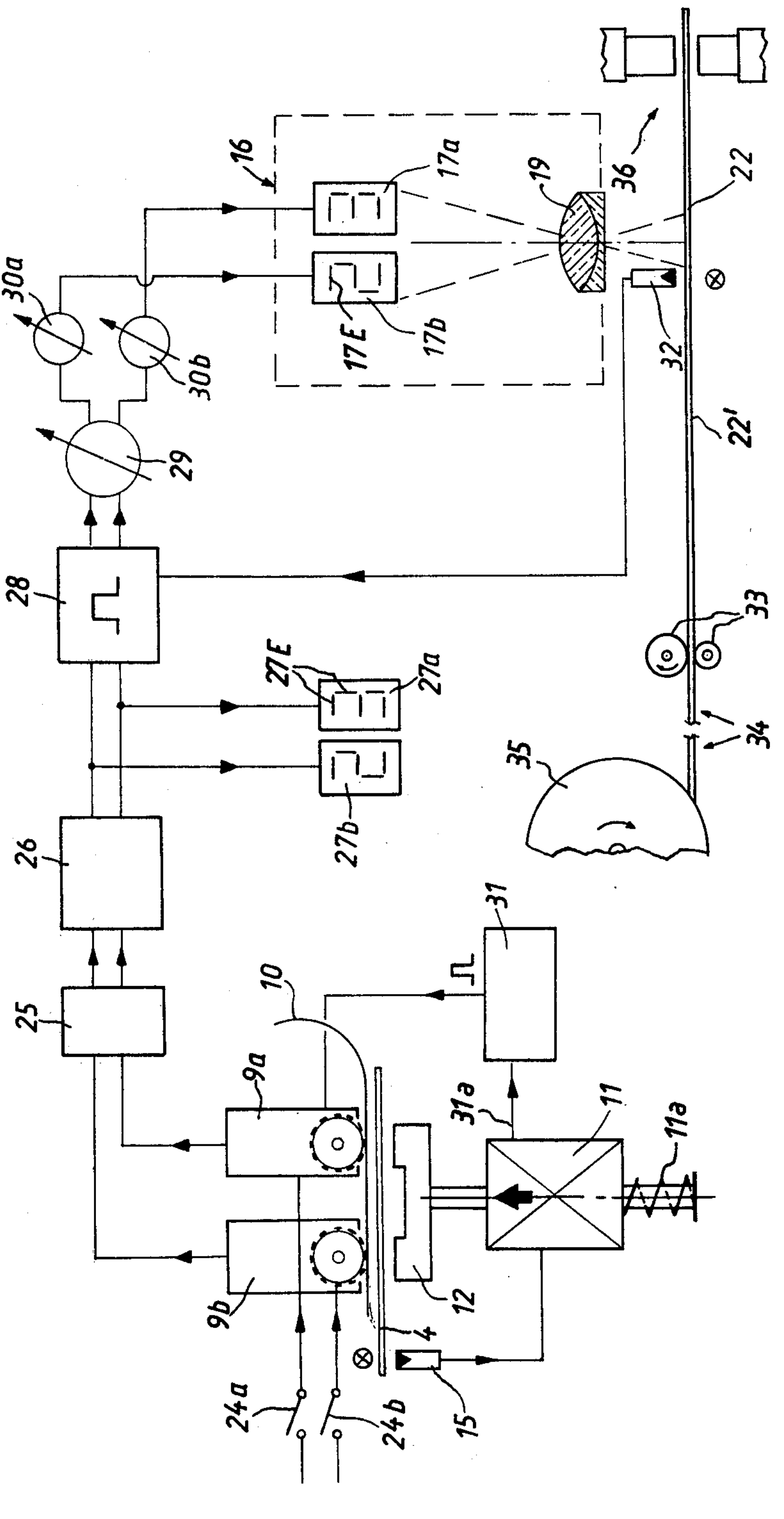
FIG. 5 illustrates the means for synchronizing the operation of indicia applying devices of the two marking units and a portion of the film transporting unit.

The counter 9 is a commercially available four-stage digital counter. Two stages are shown in FIG. 5, as at 9*a* and 9*b*. Such stages form a row in line with the adjacent portion of the ink carrier or ribbon 10. The units stage 9*a* receives a pulse whenever the ram 12 completes a return stroke to thus set the stage 9*a* for the application of the next-following digit. The electromagnet 11 is normally energized in response to stoppage of the motor 14 and propels the ram 12 forwardly (against the opposition of a return spring 11*a*) whereby the ram strikes against the adjacent side of the envelope 4 in the channel 5. The other side of the envelope 4 is then provided with one or more indicia by the ribbon 10 which overlies the exposed sides of the counter stages. The motor 14 is started (preferably with a certain delay) in response to retraction of the ram 12 by the spring 11*a* whereby the friction wheels 13 advance the freshly marked envelope 4 toward the container 6. As mentioned above, each marked envelope strikes against the side wall 6*a* and descends on top of the stack 6A. The inertia of a marked envelope 4 which advances beyond the friction wheels 13 suffices to insure that each and every marked envelope reaches the side wall 6*a*. When the container 6 is full, the stack 6A is transferred to the station where the envelopes 4 receive the associated films 22 (or sections of such films) and the corresponding prints (if any).

If desired, the stage 9*a* of the counter 9 can be set to place the next-higher digit into register with the ribbon 10 in response to introduction of a fresh envelope 4 into the inlet 3 of the channel 5. Thus, successive envelopes 4 are numbered consecutively, i.e., each envelope receives a different indicium or a different set of indicia.

It will be noted that the indicia applying device 9–12 of the marking unit 7 shown in FIG. 1 imprints indicia on predetermined portions of successive envelopes 4. This device is designed to apply indicia in the form of numerals (from 1 to 9999).

Figure 3:
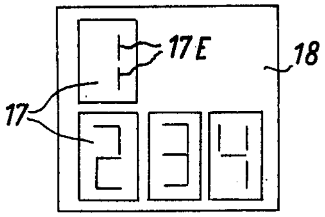
FIG. 3 is a plan view of a detail of the film marking unit as seen in the direction of arrows from the line III—III of FIG. 2.

FIG. 2 shows a second marking unit 16 including a device which applies (exposes) indicia to successive exposed photographic films 22. The marking unit 16 is an optical unit which images suitable indicia onto the non-exposed portions of successive films. The indicia constitute numerals of the type well known from encoding apparatus. Such numerals are formed by four numeral grids 17 which are installed on a base plate 18 at one end of a tubular light duct 20. The other end of the duct 20 is adjacent the path of films 22 (in a suitably configurated guide 21) and mounts a lens 19 of short focal length. Each grid 17 has seven glow wires or analogous light emitting elements 17E which can be brought to incandescence in a number of arrays to form any one of ten numerals 0 to 9. As shown in FIG. 3, three grids 17 can form a row and the fourth grid is disposed in line with a selected grid of such row.

The marking unit 16 is installed in the interior of the housing 1 so that it cannot be reached by daylight or artificial light. The film guide 21 receives successive exposed films 22 as soon as such films are withdrawn from the respective cassettes (not shown). As a rule, an exposed film is withdrawn from the cassette with the trailing end 22A (see FIG. 4*a* or 4*b*) located ahead of the last exposed frame 22B, and the trailing end 22A is not exposed so that it can properly receive the images of numerals selected by the grids 17. In most instances, the length of the non-exposed trailing end 22A of a customer film 22 is amply sufficient to allow for proper exposure of several numerals identical with or otherwise related to those which have been applied to the associated envelope 4 by the indicia applying device 9–12 of the marking unit 7 of FIG. 1. The optical axis of the marking unit 16 is preferably normal to the plane of the adjacent portion of film 22 in the guide 21.

Figure 4A:
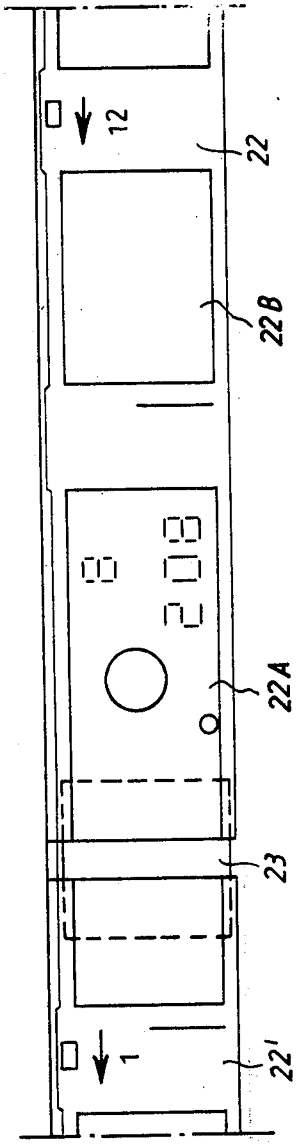
FIG. 4*a* shows the splice between two photographic films and one type of indicia on the trailing end of a film.
Figure 4B:
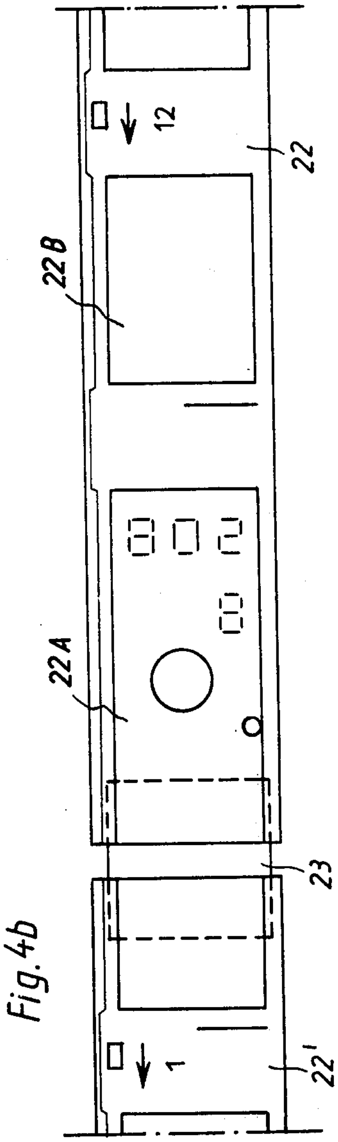
FIG. 4*b* illustrates another type of indicia on the trailing end of one of two spliced-together films.

FIGS. 4*a* and 4*b* show that the marking unit 16 can apply indicia transversely of or in the longitudinal direction of exposed but undeveloped films. The uppermost grid 17 of FIG. 3 is preferably shiftable so that it can be placed into alinement with an outer grid of the row of three grids 17 (see FIG. 4*b*) or in register with the central grid of such row (see FIG. 4*a*). FIGS. 4*a* and 4*b* further show a uniting band 23 which connects the leader of a preceding film 22' with the trailing end 22A of the next-following film 22. The manner in which the uniting band 23 can be welded or bonded to the abutting ends of successive films is disclosed, for example, in the commonly owned copending application Ser. No. 751,313 filed Dec. 16, 1976 by Franz Komenda et al.

It is preferred to design the marking unit 16 in such a way that the dimensions of numerals which are imaged onto the trailing portions 22A of successive films 22', 22, etc. are a small fraction (e.g., one-third) of the dimensions of numerals on the grids 17. Actually, the trailing portions 22A are located at the front ends of the respective films (i.e., they constitute the leaders of such films, as considered in the direction of movement of films along the path defined by the guide 21); however, they can be called trailing ends because each thereof is adjacent the last exposed frame 22B of the respective film. This is due to the fact that, as a rule, the trailing portion 22A is first to emerge from a cassette during removal of exposed customer film from each cassette. Reference may be had to the commonly owned copending application Ser. No. 652,107 filed Jan. 26, 1976 now U.S. Pat. No. 4,004,724, issued Jan. 25, 1977 by Zangenfeind et al. or to commonly owned copending application Ser. No. 729,773 filed Oct. 5, 1976 by Klose. The commonly owned copending application Ser. No. 729,700, filed Oct. 5, 1976 by Hujer et al., discloses an apparatus for splicing together films which are removed from cassettes in a manner as disclosed in Ser. No. 652,107 and/or films which are removed from cassettes upon partial or complete destruction or opening of cassettes.

The splicing station where the films 22', 22, etc. are attached to each other end-to-end is preferably installed close to the locus of withdrawal of trailing ends 22A from the respective cassettes. Thus, the trailing ends 22A can be spliced to the preceding films 22' prior to complete withdrawal of respective films 22 from their cassettes; complete withdrawal takes place while the film 22 moves with the preceding film toward the reel which collects the aforementioned web.

FIG. 5 illustrates that portion of the apparatus which insures the application of identical or related indicia to envelopes 4 and associated films 22. In other words, the structure of FIG. 5 synchronizes the indicia applying devices of the marking units 7 and 16 in such a way that the numeral which is applied to an envelope 4 is identical with or otherwise related to the numeral which is exposed onto the trailing end 22A of the associated film 22. The structure of FIG. 5 further includes means for monitoring the operation or condition of certain components of the apparatus. For the sake of simplicity, FIG. 5 merely shows two stages (9*a* and 9*b*) of the digital counter 9 and only two grids 17*a*, 17*b* of the indicia applying device 17–20 of the marking unit 16.

Two electric switches 24a, 24b are mounted on or adjacent the table 2 of FIG. 1 so that they can be readily reached by an attendant who is in charge of introducing envelopes 4 into the guide channel 5. The switches 24a, 24b constitute two components of means for adjusting the marking unit 7 by setting or resetting the digital counter 9. The input of the low order or singles stage 9a of the counter 9 is connected with a pulse generator 31 which is connected to the electromagnet 11 of the marking unit 7 and transmits a pulse in response to each retraction of the ram 12 so as to place the next-higher numeral of the stage 9a into register with the ribbon 10. The manner in which the stage 9b is actuated in response to transmission of each tenth pulse to the stage 9a is conventional and is not shown in FIG. 5. The means for transmitting signals from the electromagnet 11 to the pulse generator 31 is indicated by the arrow 31a.

The outputs of the stages 9a and 9b are connected with a monitoring circuit 25 which forms part of synchronizing means and transmits signals to a modifying (code-changing) circuit 26. The circuit 26 transmits signals to a display device (including the grids 27a, 27b) serving to permit observation of indicia about to be exposed onto the trailing end 22A of the film 22 which is in register with the lens 19 of the marking unit 16. Furthermore, the circuit 26 is connected with a logic circuit 28 having a discrete input for each stage of the counter 9 and a further input which is connected to the signal-generating photosensitive transducer of a detector here shown as a photoelectric cell 32 constituting a means for producing signals on detection of trailing ends of successive films in the guide 21. The outputs of the circuit 28 are connected with a maximum-current monitoring device 28 and minimum-voltage monitoring devices including those shown at 30a and 30b. A discrete monitoring device 30 is provided for each grid 17 of the marking unit 16. The purpose of the devices 30 is to determine whether or not the elements 17E of the associated grids emit light.

FIG. 5 further shows a reel 35 which collects a web 34 of spliced-together films (including the films 22 and 22'), intermittently driven film transporting rolls 33, and a device 36 which splices the films of the web 34 to each other.

The circuits 25, 26 of the synchronizing means (25, 26, 28, 29, 30) adjust the display device 27a, 27b and the marking unit 16 in response to each adjustment of the marking unit 7 by the pulse generator 31. The parts 27a, 27b of the display device are preferably mounted on or in the region of the control panel or table 2, and each such part may constitute a grid identical with or analogous to a grid 17 and having an array of seven light-emitting elements 27E which are adapted to emit light signals representing the indicia about to be applied by the device 17–20 of the marking unit 16.

The operation of the structure of FIG. 5 is as follows:

The attendant can select the indicia which are to be applied to an envelope 4 by actuating the switch 24a and/or 24b. These switches can also serve to reset the counter 9 to zero. The outputs of the stages 9a and 9b transmit signals each of which is indicative of one of ten digits, and such signals are transmitted to the monitoring circuit 25 of synchronizing means. The latter detects any changes in the characteristics of signals from the stages 9a, 9b and transmits appropriate signals to the circuit 26 which causes the display device including the grids 27a, 27b to allow for observation of a replica of indicia which are about to be imprinted on the envelope 4 whose leader is located in the range of the detector 15. The grids 27a, 27b are observable by the attendant at the table 2.

The circuit 26 further transmits a signal to the logic circuit 28 which causes the marking unit 16 to expose the indicia furnished by the grids 17a, 17b onto the trailing end 22A of the associated film 22 whose trailing end has been detected by the cell 32. The duration of each exposure may be in the range of a fraction of one second (e.g., one-tenth of a second). In accordance with a feature of the invention, the circuit 28 constitutes a blocking means for the marking unit 16 because it can transmit an exposure signal (i.e., a signal to initiate actuation of the marking unit 16) only when it receives an appropriate signal from the detector 15 and/or 32 which transmits such signal when it determines that the envelope 4 and/or trailing end 22A of the associated film 22 is in proper position for imprinting or exposure of indicia. For example, the detector 32 may constitute an infrared photocell which can serve the additional function of regulating the extraction or removal of films from their cassettes upstream of the splicing device 34.

The device 29 determines whether or not the elements 17E of the grids 17 emit any light during the intervals between successive exposures, i.e., whether or not the current in each element of each grid is close to zero ampere during each such interval. In other words, the device 29 determines whether or not all light-emitting elements 17E of each grid have been deactivated upon completion of an exposure.

The devices 30a and 30b monitor the condition of corresponding grids 17a, 17b during the making of an exposure. These devices determine whether or not at least two light-emitting elements 17E of the corresponding grids emit light at the time when the marking unit 16 is supposed to expose indicia onto the trailing end 22A of a film 22. The devices 30a, 30b can be said to monitor the respective grids for the presence or absence of defects. For example, the devices 30a, 30b can be designed in such a way that they furnish signals which indicate whether or not the marking unit 16 has actually exposed or is about to expose a set of indicia onto a film 22. If the elements 17E of the grid 17a or 17b furnish light which is needed to insure the exposure of at least one indicium (e.g., the numeral one), at least two such elements must receive the necessary energy. This is detected by the devices 30a, 30b. If the voltage which is applied is less than a predetermined minimum voltage, one can assume that the operation of the marking unit 16 is unsatisfactory.

When the marking unit 7 completes the application of one or more indicia to the adjacent envelope 4, the spring 11a retracts the ram 12, i.e., the electromagnet 11 is deenergized. The pulse generator 31 then receives a signal via 31a and transmits a pulse to the stage 9a of the counter 9. The application of indicia can begin as soon as the next envelope 4 reaches the marking station in the channel 5.

The apparatus may further include a suitable lamp testing circuit (not shown) which can be used to determine the condition of all light-emitting elements (wires) in the grids 17 in a time-saving manner and to effect proper optial focussing of the lens 19.

It is preferred to utilize an adjustable circuit 28; this enables the attendant (or an automatic film speed monitoring device) to select the exposure time in dependency on the sensitivity of films 22. The circuit 22 is preferably an electronic switch which is actuated in response to a signal and remains actuated for a selected interval of time. The duration of such interval can be adjusted, either manually or automatically, in dependency on the sensitivity of films.

It is further clear that the detectors 15 and 32 constitute but one form of means which can be used to scan the respective paths for the presence or absence of envelopes 4 and films 22. For example, at least one of the detectors 15, 32 can be replaced with a mechanical contact which slidingly engages the envelopes or the films, or with a microswitch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for the application of indicia to receptacles for films and to associated films, comprising means for transporting successive receptacles and successive associated films along discrete first and second paths; first and second adjustable marking units respectively adjacent said first and second paths and respectively including a first device for applying different first indicia to successive receptacles and a second device for applying different second indicia to successive films, each of said first indicia being normally related to one of said second indicia; first and second detector means for respectively scanning said first and second paths and for respectively transmitting first and second signals on detection of receptacles and films in predetermined positions relative to the corresponding units; means for synchronizing said devices so as to insure the application of related first and second indicia in response to each actuation of said units, including means for blocking the actuation of at least one of said units in the absence of at least one of said signals; and means for adjusting one of said units upon each actuation of said one unit so as to set the respective device for the application of a different indicium.

2. Apparatus as defined in claim 1, wherein said synchronizing means includes means for adjusting the other of said units in response to each adjustment of said one unit by said adjusting means, said units being actuated in response to said signals.

3. Apparatus as defined in claim 2, wherein said other unit is said second unit.

4. Apparatus as defined in claim 1, wherein said device of said first marking unit includes means for imprinting first indicia on successive receptacles.

5. Apparatus as defined in claim 4, wherein said imprinting means includes a digital counter having several stages, an ink carrier between said stages and a receptacle in said predetermined position, and electromagnet means having an armature movable to and from a position in which a receptacle in said predetermined position is pressed against said carrier and said carrier is pressed against said stages.

6. Apparatus as defined in claim 1, wherein said device of said second marking unit comprises means for exposing second indicia onto an unexposed portion of a film in said predetermined position.

7. Apparatus as defined in claim 6, wherein said exposing means comprises grids having light-emitting elements representing said second indicia and an optical system for imaging said light-emitting elements onto the unexposed portion of a film in said predetermined position.

8. Apparatus as defined in claim 7, wherein each of said grids has seven light-emitting elements.

9. Apparatus as defined in claim 1, wherein said adjusting means comprises pulse generator means.

10. Apparatus as defined in claim 9, wherein said one unit is said first unit and said first device includes means for imprinting first indicia on successive receptacles, said imprinting means including electromagnet means which is energizable to effect actuation of said first unit and is deenergized on completion of actuation of said first unit, said pulse generator means being responsive to deenergization of said electromagnet means to produce a pulse for adjustment of said first unit.

11. Apparatus as defined in claim 9, wherein said pulse generator means is arranged to adjust said first unit in response to each first signal.

12. Apparatus as defined in claim 1, wherein said second device includes electrical components and said synchronizing means includes means for monitoring the current and voltage applied to said components.

13. Apparatus as defined in claim 1, further comprising means for adjusting said first detector means with respect to said first path.

14. Apparatus as defined in claim 1, wherein said first detector means comprises a photoelectric cell.

15. Apparatus as defined in claim 1, wherein said first detector means comprises a mechanical scanner.

16. Apparatus as defined in claim 1, wherein said second detector means comprises a photoelectric cell.

17. Apparatus as defined in claim 16, wherein said cell is an IR cell.

18. Apparatus as defined in claim 16, wherein said films are removed from discrete cassettes prior to introduction into said second path and said cell is arranged to regulate the removal of films from the respective cassettes.

19. Apparatus as defined in claim 1, wherein said one unit is said first unit and said synchronizing means comprises means for monitoring the adjustment of said first unit and means for adjusting said second unit in response to detection of adjustment of said first unit.

20. Apparatus as defined in claim 19, wherein said first device comprises a digital counter having a plurality of stages including a low-order stage which is adjusted by said first mentioning adjusting means and said second device includes a plurality of adjustable grids having light-emitting elements, said last mentioned adjusting means including means for directly adjusting said grids.

21. Apparatus as defined in claim 20, wherein said last mentioned adjusting means comprises a code-changing device connected with said monitoring means and a logic circuit connecting said code-changing device with said grids.

22. Apparatus as defined in claim 21, wherein said second device is arranged to expose different second indicia onto successive films and said logic circuit includes means for determining the exposure times.

23. Apparatus as defined in claim 1, wherein said synchronizing means comprises means for changing the interval of actuation of the other of said marking units.

24. Apparatus as defined in claim 1, wherein said synchronizing means includes means for displaying said second indicia.

25. Apparatus as defined in claim 24, further comprising a manned control panel including means for directing receptacles into said first path, said display means being disposed on or in the region of said control panel.

26. Apparatus as defined in claim 24, wherein said displaying means includes a plurality of grids each having an array of seven light-emitting elements adapted to emit light signals representing said second indicia.

27. Apparatus as defined in claim 1, further comprising manually operated means for adjusting said first marking means.

28. Apparatus as defined in claim 27, further comprising a manned control panel, said first device including a digital counter having a plurality of adjustable stages and said last mentioned adjusting means including elements mounted on said panel and being actuatable to adjust said stages.

* * * * *